United States Patent [19]
Bischoff

[11] Patent Number: 6,099,031
[45] Date of Patent: Aug. 8, 2000

[54] PASSIVE RESTRAINING SYSTEM FOR MOTOR VEHICLES AND AIR BAG MODULE AS RESTRAINING ELEMENT

[75] Inventor: Michael Bischoff, Adelschlag, Germany

[73] Assignee: BSRS Restraint Systems GmbH, Alzenau, Germany

[21] Appl. No.: 08/952,813

[22] PCT Filed: May 30, 1996

[86] PCT No.: PCT/EP96/02320

§ 371 Date: Mar. 4, 1998

§ 102(e) Date: Mar. 4, 1998

[87] PCT Pub. No.: WO96/38323

PCT Pub. Date: Dec. 5, 1996

[30] Foreign Application Priority Data

May 30, 1995 [DE] Germany ............... 195 19 130

[51] Int. Cl.$^7$ ................................................. B60R 21/32
[52] U.S. Cl. .................................................. 280/735
[58] Field of Search ................................. 280/735, 731

[56] References Cited

U.S. PATENT DOCUMENTS

| | | | |
|---|---|---|---|
| 5,400,487 | 3/1995 | Gioutsos et al. | 290/735 |
| 5,411,289 | 5/1995 | Smith et al. | 280/735 |
| 5,413,378 | 5/1995 | Steffens, Jr. et al. | 280/735 |
| 5,454,591 | 10/1995 | Mazur et al. | 280/735 |
| 5,468,014 | 11/1995 | Gimbel et al. | 280/735 |
| 5,515,933 | 5/1996 | Meyer et al. | 180/273 |
| 5,525,843 | 6/1996 | Howing | 280/735 |
| 5,636,864 | 6/1997 | Hori | 280/735 |
| 5,696,777 | 12/1997 | Hofdaess | 371/68.1 |
| 5,782,485 | 7/1998 | Takeda et al. | 280/735 |

FOREIGN PATENT DOCUMENTS

| | | |
|---|---|---|
| 0 568 901 A3 | 11/1993 | European Pat. Off. . |
| 38 11 217 A1 | 10/1989 | Germany . |
| 41 12 579 A1 | 10/1991 | Germany . |
| 42 43 826 A1 | 6/1994 | Germany . |
| 9422693 | 10/1994 | WIPO ................... 280/735 |
| WO 95/11819 | 5/1995 | WIPO . |

OTHER PUBLICATIONS

Walter Heywang, "Sensorik", Springer–Verlag, Berlin Heidelberg, New York, pp. 212–214 (1993).

Von Guido Wetzel, "Steuerung eines Mehrfach–Rückhaltesystems", ATZ Automobiltechnische Zeitschrift,96:10, pp. 618–619 (1994).

Primary Examiner—Brian L. Johnson
Assistant Examiner—Michael Britton
Attorney, Agent, or Firm—Akin, Gump, Strauss, Hauer & Feld, L.L.P.

[57] ABSTRACT

A passive restraining system for motor vehicles, which has at least one crash sensor (10 and 10'), which generates a signal indicating an accident and its severity, and optionally forms a structural unit with the central electronics unit (20). In this, the signal from the crash sensor is evaluated. The system moreover has a number of restraining components such as air bags (30) and belt retractors (40) and position and child seat recognition sensors (50) and seat occupation sensors (60) allocated to these for recognition of the respective actual use status of the vehicle seats (70), and one belt position sensor per vehicle seat. The flexibility of the system is thereby decisively increased in accordance with one solution proposal, in that the individual restraining components receive a content signal from the central electronics unit (20) in the event of an accident to react, whereby the individual restraining components (30, 40) compute their reaction signals themselves in a processor assigned to them as a function of the signals of the sensors and crash sensors respectively allocated to them.

7 Claims, 1 Drawing Sheet

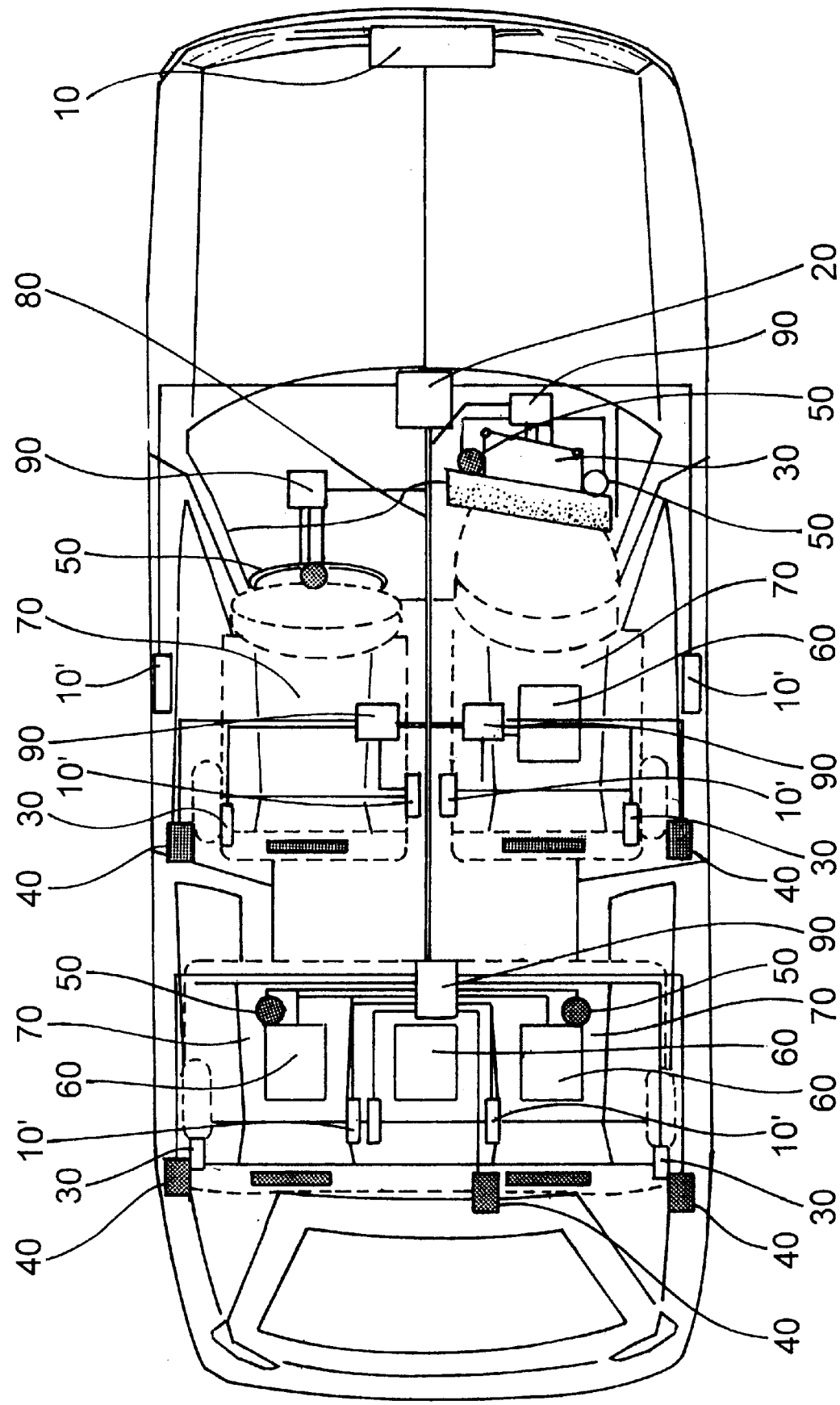

PASSIVE RESTRAINING SYSTEM FOR MOTOR VEHICLES AND AIR BAG MODULE AS RESTRAINING ELEMENT

BACKGROUND OF THE INVENTION

The present invention concerns a passive restraining system for use in motor vehicles as well as an air bag module as restraining component, as it is preferably used in the passive restraining system.

Passive restraining systems for motor vehicles have been used in practice for a long time in multiple constructions. A restraining component of such a restraining system is an air bag, thus a gas sack which is inflated within fractions of a second in the event of an accident, in order to catch the trunk of the driver and/or passenger thrown forward by the impact. Such a restraining system including an air bag has available a so-called crash sensor, which in the event of an accident generates an appropriate signal which is then further processed by an evaluation electronics unit.

A crash sensor is usually a delay measuring device, that is, the negative acceleration is measured, which is basically stronger in the event of an accident than in normal braking of a motor vehicle in normal road traffic. If, among other things, the value of the negative acceleration exceeds a certain preset value, the evaluation electronics unit interprets this such that an accident has occurred, whereupon a prompting signal is generated to trigger a restraining component. The prompting signal causes, for example, a charge to be ignited, whereupon its explosion gases fill the gas sack. Another possibility is allowing a gas stored under pressure to expand into the gas sack after an activator has received an appropriate prompting signal.

Other known restraining components of a restraining system are so-called belt retractors, that is devices which tighten the safety belts in the event of an accident, in order to hold the persons in the wrecked vehicle more firmly in the vehicle seats.

Common to all known systems is that the reactions of the restraining components occur according to the classical either/or principle, that is, that the components react in only one predetermined manner after recognition of an accident situation by the crash sensor. The air bag thus only inflates and the belt retractor tightens the belt, and to be sure completely independently of whether further conditions are fulfilled. It is just this, however, which leads to problems in practice. Let it be mentioned here, for example, that fatal incidents can transpire owing to the either/or principle if, for example, a so-called reboard child's seat is placed on the passenger seat and is fastened there by means of the safety belt. In the event of an accident, the inflation of the passenger air bag can represent a lethal danger for the child sitting or lying on the seat. It is also evident that the standard reaction of a restraining component, for example the air bag, cannot be equally optimal for persons of different body weight or different body circumference. Traditional systems and components are thus not flexible, wherein a serious disadvantage of known systems is seen.

Passive restraining systems are described in the patent literature, for example, in U.S. Pat. No. 5,413,378 and DE-A-41 12 579. All these devices have a central control device which is supposed to undertake the task of collision recognition, signal preparation and transmission. However, if this device itself is damaged by the impact, a total failure of the restraining system can take place with full consequences for the motor vehicle occupants. Nothing else would apply for the safety device in accordance with DE-A-38 1 217, much less for the air bag system in accordance with WO 95/11819, according to which an electronic control unit controls the operation of a multiple stage gas generator dependent upon various signals detected by sensors.

Indeed, it is known, for example, from DE-Z-"Sensor Technology," Springer Publishing Company 1992, W. Heywang to arrange a series of sensors, which form part of a network, in a decentralized manner. This alone, however, does not suffice with respect to the special requirements for a passive restraining system in a motor vehicle to guarantee the safety of the vehicle occupants, as long as namely a central control device is provided, as described in the above-mentioned publications.

SUMMARY OF THE INVENTION

Against this background, it is now the object of the present invention to create a remedy, that is therefore, to create a passive restraining system for motor vehicles, which can react flexibly in a situation-dependent manner in the event of an accident. Moreover, a component usable in such a system is to be proposed.

The invention proceeds from a restraining system which has at least one crash sensor, which generates a signal indicating an accident and its severity, and optionally forms a structural unit with a central electronics unit described below. In this, the signal is evaluated by the crash sensor. This system has a number of restraining components, such as air bags or belt retractors, as well as position, child seat recognition and seat occupation sensors assigned to this for recognition of the respective actual use status of at least one, preferably all vehicle seats. Moreover, a so-called belt position sensor is provided per vehicle seat to determine if the belt is being worn or not.

The object underlying the invention is accomplished by a restraining system of the type described above, characterized by the individual restraining components receiving a content signal from the central electronics unit in the event of an accident to react, whereby the individual restraining components compute their reaction signals themselves in a processor respectively allocated to them, as a function of the signals from the position, child seat recognition and seat occupation sensors, belt position sensors and the crash sensor respectively assigned to them. This system at its core proceeds from a system similar to that in the prior the art. Of course, the present central electronics unit has no processor which conducts all the calculations for all restraining components. Moreover, so-called seat occupation sensors are provided, by means of which essentially the weight of the person sitting on the respective vehicle seat is determined, for example by means of a weight measurement, and permits it to be entered as a further parameter into the calculation of the optimal reaction prompting signal.

In accordance with this proposal, the object is accomplished in that the individual restraining components, in the event of an accident, receive a content signal from the central electronics unit to react, whereby the individual restraining components compute their reaction signals themselves in a processor respectively allocated to them as a function of the signals from the position, child seat recognition and seat occupation sensors, belt position sensors and the crash sensors respectively assigned to them.

The central electronics unit thus merely issues the signal to the individual restraining components, in the event of an accident, to exercise their designed functions. In this case, a relatively complicated data telegram is not transmitted to each restraining component, but merely the prompt to react.

How the reaction of each individual restraining component should then appear has been determined by each of the components in advance on the basis of the actual use status of each motor vehicle seat itself determined by the sensor technology. The possible reactions correspond to the reactions of the first embodiment.

By this proposal, the central electronics unit is freed from relatively complicated calculations of individual reaction prompting signals in the form of costly data telegrams in the event of an accident. If one considers what the electronics unit of a motor vehicle has to accomplish in the event of an accident, life-determining time advantages can result herefrom under certain circumstances, specifically from the fact that the central electronics unit for the restraining system must simply issue a signal, in order to allow the restraining components to react in an individual manner. Moreover, a central electronics unit is also not protected from damage in the event of an accident. The probability that the central electronics unit can still generate the relatively simple signal to react is, of course, greater than requiring the electronics unit to generate the individual reaction prompting signals for all restraining components or recall them from memory. To this extent, a greater security is achieved by the additional hardware expense in connection with the invention, namely the decentralized arrangement of processors for each restraining component.

It is provided in accordance with an advantageous refinement of the invention that the central electronics unit stands in connection with the individual restraining components over a bus line. This can take place over suitable data transmission interfaces.

An advantage of coupling the individual restraining components to the central electronics unit over a bus can be seen in that the electromagnetic compatibility (EMC) is clearly increased in comparison with individually wired systems. The decentrally and modularly constructed restraining system in accordance with the present invention permits the use of bus architecture in a suitable manner, whereby the security of the system is once again increased. With individually wired systems, disturbing influences can arise from adjacent electric lines, which are not part of the restraining system so that under certain circumstances, erroneous reactions of individual components can occur.

The further aspect of the object underlying the present invention, namely to create an air bag module, which is suited for use in the restraining system of the invention, is accomplished by the air bag module having available its own electronic evaluation unit, in which signals from sensors such as position, child seat recognition and seat occupation sensors, and belt position sensors are evaluated with respect to the actual use status of the respective vehicle seat, where upon a triggering signal introduced from the outside, the electronic evaluation unit activates the gas generator as a function of determined actual use status of the vehicle seat, such that, depending upon the situation, one or more chambers of the gas sack are filled with gas. Here one proceeds from the assumption that the module has available a multistage gas generator, known per se, and a single or multiple chamber gas sack. The multistage gas generator is in the position, with suitable triggering, to conduct various amounts of gas, if necessary at various gas pressures, into a gas sack. A multiple chamber gas sack as such, is likewise known. The inflation of a different number of chambers of the gas sack serves here to adapt the inflation volume.

The air bag module of the invention has available its own electronic evaluation unit, in which the signals from sensors, such as the already mentioned position, child seat recognition and seat occupation sensors, as well as belt position sensors, are evaluated with respect to the actual use status of the respective motor vehicle seat. The triggering signal supplied from outside, thus for example, the content signal issued by the central electronics unit to react, activates the gas generator depending on the determined actual use status of the vehicle seat, as well as possibly on the crash sensor, such that one or more chambers of the gas sack are filled with gas depending on the situation. Here it should once again be recalled that the signal from the crash sensor also contains encoded the severity of the accident. In this way, the air bag module is in the position to react in an optimal manner as a function of the respective actual values determined for the use of the respective vehicle seat and as a function of the severity of the accident. Hence, the module is, for example, designed in such a way that the gas generator inflates all chambers of the gas sack at full pressure, if it has previously been determined that a relatively large person is sitting on a vehicle seat. If, for example, a reboard child's seat is set upon the passenger seat and secured with the safety belt, then it is established on the basis of the belt extension (very long) and the weight determination (relatively light) and on the basis of connecting both signals that the gas sack will not be inflated at all in case of an accident detected as relatively mild, in order not to permit occurrence of the dangerous situations sketched at the beginning.

The air bag module of the invention is not restricted to being used as an air bag on the driver or passenger side. It can be used in the back seats, as well as a side air bag.

The sensor technology of the module can also be advantageously supplemented by a temperature sensor on the gas generator, which records its temperature and prepares a corresponding signal, which is fed to the electronic evaluating unit. The reason for this measure is that gas generators are extremely temperature-dependent, that is in the final analysis, the gas pressure with which the gas bag is inflated depends to an extreme degree on the exterior temperature. At lower temperatures, the pressure is relatively slight, at high temperatures extremely high. The air bag module of the invention permits implementing a compensation for this, in that specifically, for example, at very low temperatures more chambers are inflated than would be the case under otherwise unchanged parameters at high temperatures.

Finally, it is provided in accordance with an advantageous refinement, that the module has an additional indicator, which triggers the inactivation of the module with a positive signal from the child seat recognition sensor. With a positive signal, meaning that the sensor has recognized a child's seat, it can thereby be communicated to the motor vehicle driver that a danger for the child owing to an accidental or unintentional inflation of the air bag cannot occur on account of a malfunction of the module. At what degree of accident severity the air bag is inflated, when a child seat is recognized in the passenger seat, is governed by various philosophies of safety.

BRIEF DESCRIPTION OF THE DRAWINGS

The invention is explained in greater detail on the basis of an embodiment according to the single drawing FIGURE as an example.

DETAILED DESCRIPTION OF THE INVENTION

This shows a schematic view of a motor vehicle with a more complex restraining system in comparison to the prior art. In the present case, a crash sensor 10 mounted in the front is provided here along with additional crash sensors 10'. These conduct their signals to the central electronics unit 20, which in the present case has does not have any internal processor at its disposal. Rather, each restraining component, such as air bag 30 and belt retractor 40, is allocated its own processor. The decentrally arranged processors (not shown) process the signals, which they receive from the position and child seat recognition sensors 50 in addition to the seat occupation sensors 60 which are allocated to each vehicle seat 70.

The seat occupation sensors 60 operate, for example, according to the principle that the weight of the person sitting on the respective motor vehicle seat is determined in order then to be entered into the decentrally arranged processors as a parameter in the calculation of the optimal reaction of the air bags 30 and the belt retractors 40.

In the present case, all restraining components (air bags 30), belt retractors 40) are connected via schematically indicated data interfaces 90 by a bus 80 with the central electronics unit 20. This has, as already mentioned at the beginning, the advantage of a lower system expenditure in contrast to individual cabling, and chiefly, however, of increasing the electromagnetic compatibility (EMC) against disturbing influences from outside from other electrical systems or, in relation to individual cabling, the extensive exclusion of disturbing influences of data telegrams in adjacent cables.

In the decentrally arranged restraining components, the optimal reaction signals are thus computed, depending upon the actual use degree of each motor vehicle seat, and stored if need be. In the event of an accident, the crash sensors 10 and 10' signal this circumstance, whereupon the central electronics unit 20 activates the restraining components via a data bus 80 with a general signal, that is not individually adjusted to the respective restraining components. This activation signal corresponds to the prompt to react immediately. After receiving this signal, each restraining component 40 and 30 than triggers the optimal reaction, preferably calculated in advance. An online calculation would indeed also be conceivable, which, of course, would lengthen the reaction time.

What is claimed is:

1. A passive restraining system for motor vehicles comprising:
   at least one crash sensor (10, 10') that generates a trigger signal indicating the occurrence of an accident and its severity;
   restraining components including air bags (30) and belt retractors (40);
   a central electronics unit (20) in which the trigger signal from the crash sensor is evaluated, the central electronics unit forwarding a trigger signal to the restraining components;
   occupant position sensors, child seat recognizing sensors (50) and seat occupation sensors (60) each being assigned to the restraining components for recognizing the respective actual use and status of at least one motor vehicle seat (70);
   one belt sensor per motor vehicle seat (70) for determining if a belt of the belt retractor is being worn; and
   a processor respectfully allocated to each of the restraining components and being in electrical communication with the central electronics unit to receive the triggering signal from the central electronics unit (20) in the event of an accident whereby each restraining component processor separately computes a reaction to the accident as a function of the signals from the occupant position sensor, child seat recognition sensor (50), seat occupation sensors (60) and belt sensors (70) respectively assigned to each restraining component (30, 40) to control the deployment of each restraining component.

2. A passive restraining system according to claim 1 wherein the central electronics unit (20) is electrically coupled to the restraining components (30, 40) through a bus line (80).

3. A passive restraining system according to claim 1 wherein the air bag (30) comprises a multi-stage gas generator and a gas sack having at least one chamber wherein the air bag processor receives signals from the occupant position sensors, child seat recognition sensors, sat occupation sensors (50, 60) and belt position sensors, the air bag processor evaluating the received signals to determine the actual use and status of the respective vehicle seat, and in that upon the triggering signal being received from the central electronics unit (20) the air bag processor activates the gas generator as a function of the determined actual use and status of the vehicle seat, such that, depending on the situation, one or more chambers of the gas sack are filled with gas.

4. A passive restraining system according to claim 3 wherein the air bag further includes an additional sensor provided on the gas generator which records its temperature and prepares a corresponding signal, which is fed into the air bag processor.

5. A passive restraining system according to claim 3 wherein the air bag further includes an additional indicator, which signals the inactivation of the air bag upon a positive signal from the child seat recognition sensor.

6. A passive restraining system according to claim 4 wherein the air bag further includes an additional indicator which signals the inactivation of the air bag upon a positive signal from the child seat recognition sensor.

7. An air bag module for an air bag of a motor vehicle passive restraining system, the passive restraining system having a central electronics unit in which a triggering signal is introduced based on information from a crash sensor, the air bag module comprising:
   a multi-stage gas generator;
   a gas sack having at least one chamber; and
   a processor in which signals from at least one sensor selected from the group consisting of an occupant position sensor, child seat recognition sensor (50), seat occupation sensor (60), and belt position sensor are evaluated with respect to actual use and status of a respective vehicle seat, and in that upon the triggering signal being introduced from the central electronics unit, the processor activates the gas generator as a function of determined actual use and status of the vehicle seat, such that, depending on the situation, one or more chambers of the gas sack are filled with gas.

* * * * *